Jan. 10, 1939.　　　D. S. BASIM ET AL　　　2,143,137
SYSTEM FOR PILOTING AIRCRAFT
Filed Sept. 30, 1936　　　2 Sheets-Sheet 2
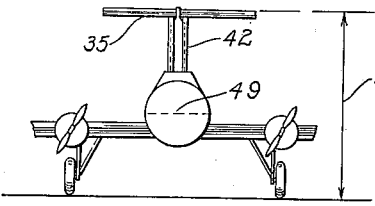
Fig 7
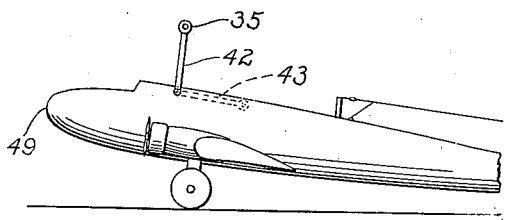
Fig 8
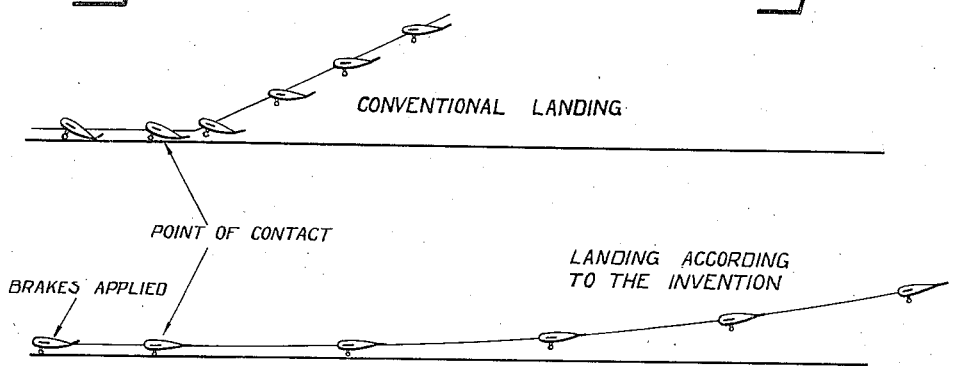
Fig 9
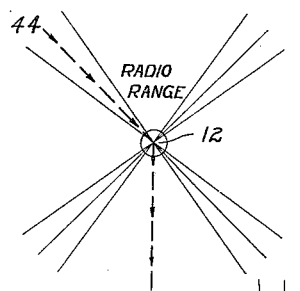
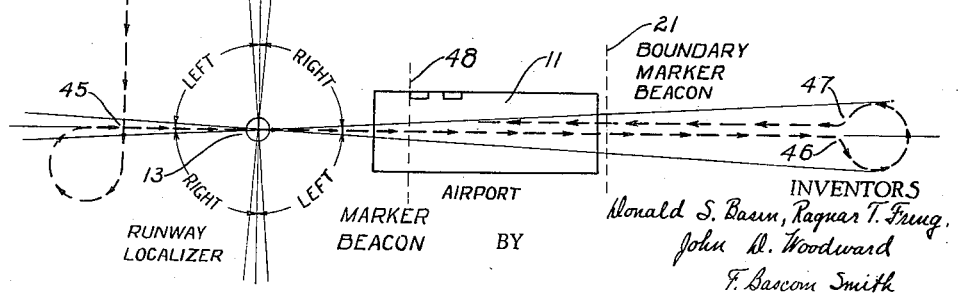
Fig 10
INVENTORS
Donald S. Basim, Ragnar T. Freng,
John D. Woodward
BY F. Bascom Smith
ATTORNEY Patented Jan. 10, 1939

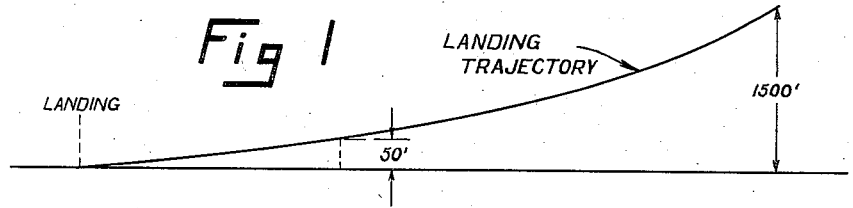
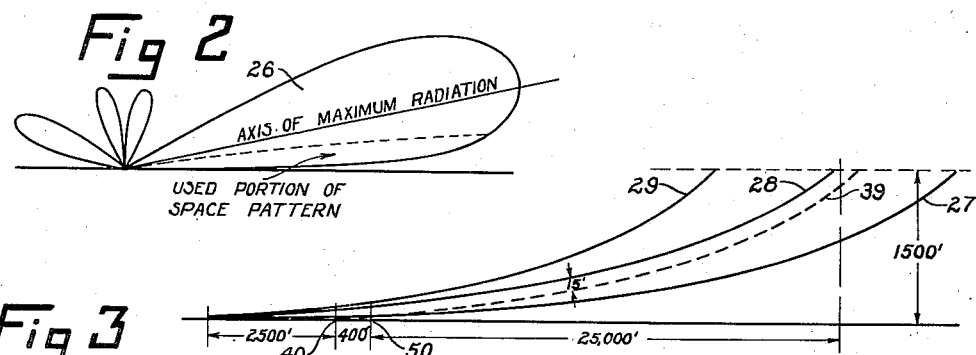
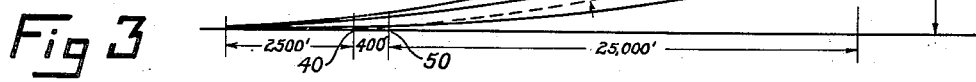
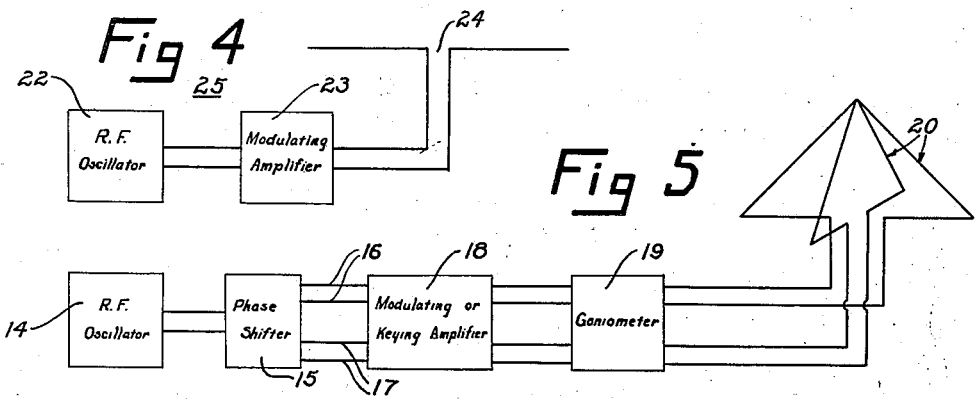
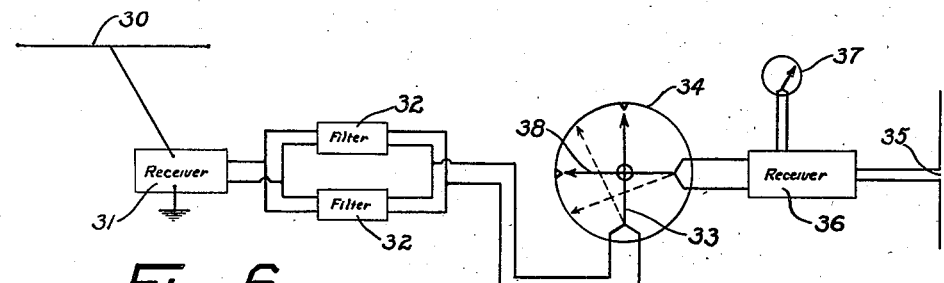

2,143,137

UNITED STATES PATENT OFFICE 2,143,137

SYSTEM FOR PILOTING AIRCRAFT

Donald S. Basim, Washington, D. C., Ragnar T. Freng, Oakland, and John D. Woodward, Alameda, Calif., assignors to Bendix Aviation Corporation, South Bend, Ind., a corporation of Delaware Application September 30, 1936, Serial No. 103,306

5 Claims. (Cl. 244—1)

This invention relates to a system for piloting aircraft and more particularly to the safe and comfortable landing of aircraft under conditions of zero visibility.

One of the major difficulties involved in safe flight has been the problem of landing aircraft in times of fog, darkness or other periods of low or zero visibility. In times of low visibility, the dangers of landing are such that aircraft must be kept grounded and, in the case of commercial airlines, schedules cannot be maintained, revenue is lost, and public ill will is incurred with respect to the reliability and safety of travel by air. Many attempts have been made heretofore to provide systems for landing aircraft safely during low or zero visibility, but these systems have not been suited to the practical requirements of military and commercial aircraft. One such system, involving the use of a radio landing beam, is illustrated and described in Research Paper No. 238, Bureau of Standards, United States Department of Commerce, volume 5, of October, 1930.

In all systems heretofore proposed, a three-point landing has been used, but such a method for the blind landing of aircraft is fundamentally unsound. In aircraft employing air foils as the means for developing those forces which oppose gravity, the two major elements controlling the flight of such aircraft are the attitude of the same relative to the trajectory of flight and the air speed. Air foils are useful over a range of angles of attack of approximately zero to 20°. When the upper limit of attack angle is exceeded, the lift of the air foil falls off rapidly and the aircraft becomes uncontrollable and unsafe. The lift obtained from the air foils at any useful attitude is an exponential function of air speed, and the value of the lift as compared with the weight of the aircraft determines whether the altitude of the aircraft will increase or decrease, thus determining the direction and slope of the trajectory of flight in elevation.

In aircraft of the present design, with motors throttled down, and at such an attitude as to have a minimum rate of descent while still maintaining equilibrium, the descent will be at such a rapid rate as to prevent a satisfactory landing. Upon approaching the ground, the pilot is obliged to sacrifice the desired state of stability by increasing the angle of attack in order to secure the additional lift required to decrease the rate of descent to a suitable value. The drag of the aircraft increases, however, more rapidly than the lift increases as the angle of attack is increased. Therefore, the air speed falls rapidly and it is necessary to further increase the angle of attack with a resultant decrease in air speed. Finally, the maximum useful angle of attack is exceeded, the lift falls off rapidly, the aircraft becomes unstable, and unless the same is closely adjacent the landing field, a crash occurs.

In the conventional type of landing, with the aircraft approaching the field at one hundred fifty miles per hour and at an altitude approximating one thousand feet, the motors are retarded or completely throttled. The descent is made at a high rate by settling the aircraft in until immediately prior to contact with the landing field. A sudden change is then made in the attitude of the craft, which results in reducing the air speed to approximately sixty miles per hour at the time of impact with the ground. The abrupt change in attitude results in a stall and the ship settles, rather than flies, to the field. Hence, immediately before and at the time of impact, the ship is out of control from an aerodynamic standpoint. It will be apparent that this delicate landing maneuver must be executed with split-second accuracy at exactly the proper altitude above the ground and in such a precise manner as to be within the capability only of skilled pilots with an unobstructed vision. It will therefore be clear that any such technique has no place in an instrument or blind landing system.

In all systems heretofore proposed, of which applicants are aware, the pilot is burdened with a multiplicity of duties and manual operations during the period when his craft is unstable immediately prior to and during the split-second landing period, with the result that unusual skill and many months of training are required for a pilot to acquire any facility in effecting an instrument landing. In most systems, the pilot is never sure that he can consistently bring his plane to a smooth and safe landing during periods of zero visibility every time that he is called upon to do so, despite his training and special knowledge.

One of the objects of the present invention is to provide a novel system for instrument or blind landing of aircraft whereby such aircraft may be landed smoothly and safely under all conditions of visibility.

Another object of the invention is to provide a novel blind landing system which will permit the landing of an aircraft in an aerodynamically stable attitude and air speed.

The above and other advantages and novel features of the novel system disclosed herein will appear more fully in the detailed description of the invention which is to be read in connection with the accompanying drawings illustrating the system and certain instrumentalities which may be employed in setting up and carrying out the system. It is expressly understood, however, that the drawings are for purposes of illustration only and are not designed as a definition of the limits of the invention, reference being had primarily for this purpose to the appended claims.

In the drawings, wherein like reference characters refer to like parts throughout the several views, Fig. 1 represents a landing trajectory which may be used in carrying out the present invention;

Fig. 2 is a diagrammatic showing of a vertical space pattern radiated by a beam transmitter for use in the above system;

Fig. 3 represents three suitable landing trajectories involved in the space pattern of Fig. 2;

Fig. 4 is a diagrammatic showing of transmitting apparatus and antenna suitable for propagating the marker beacon signal and a landing beam;

Fig. 5 is a diagrammatic showing of a runway localizer transmitter and antenna constituting ground equipment that may be employed in carrying out the present invention;

Fig. 6 is a diagrammatic showing of radio apparatus employed on the aircraft in accordance with the present invention;

Fig. 7 is a front elevation of an aircraft illustrating a suitable installation of landing beam receiving antenna in accordance with the present invention;

Fig. 8 is a side elevation of the construction shown in Fig. 7;

Fig. 9 is a diagrammatic view illustrating the differences between the conventional landing and the landing effected in accordance with the present invention; and, Fig. 10 is a diagrammatic view representing the maneuvers of the plane in azimuth in making a landing in accordance with the present invention.

Generally speaking, the system of the present invention requires the use of landing field apparatus including a radio range or beacon located adjacent the landing field, a transmitter for setting up a runway localizing beam adapted to direct the aircraft in azimuth, and a high frequency radiator for projecting a space pattern suitable for use as a landing beam. One or more marker beacons are also preferably provided adjacent the field or at the edge thereof to indicate to the pilot when the runway is being approached. The equipment for use on the aircraft includes an automatic pilot or stabilizer of gyroscopic or other suitable type, radio receiving means having suitable antennae, said means being connected to an indicator adapted to show the course in azimuth with respect to the runway beam, and a second indicator for showing the relative position of the craft with respect to the landing beam. The receiving means is also provided with indicating means for receiving emanations from the radio range.

The automatic pilot is employed to automatically maintain the aircraft in a stable attitude and to guide the craft automatically along the desired landing path, thereby relieving the human pilot of a multiplicity of manual operations immediately prior to and during the landing operation. Additionally, the system includes flying the plane along the beam at a speed to give stability until landing is effected. The aircraft is thus at all times in a stable flying attitude and hence the system is not subject to the inherent difficulties of prior systems. The automatic pilot not only relieves the human pilot of many manual manipulations, but maintains the aircraft in a stable condition after contact with the ground is made. The system is unusually well adapted but not limited to the landing of transport craft of the type now extensively used for carrying passengers, and has been accepted by a group of transport pilots, daily responsible for lives and property, as a safe and satisfactory system.

Referring to Fig. 1, the landing curve, as has been tested by hundreds of blind landings according to the invention, may have a slope within the limits of 1:10 and 1:50 for altitudes between 1500 feet and 50 feet, assuming that the air speed is not such as to cause the aircraft to descend at a rate greater than 500 feet per minute. For altitudes between 50 feet and zero, or at the point of contact with the ground, the slope should be between 1:30 and 1:100 so that when along this decreased slope the aircraft will have a much lower rate of descent and will, therefore, gently contact the ground.

In Fig. 9 the conventional or three-point landing is contrasted to the landing according to the invention. In slightly exaggerated form the aircraft making a three-point landing is shown in a gliding, as distinguished from a flying, attitude, and it will be seen that this attitude is abruptly changed immediately prior to contact with the ground. On the other hand, it can be seen that when landing according to the invention the aircraft comes in in a long gradual descent, contacting the ground without an appreciable change in attitude and with the aircraft being maintained at all times in a flying attitude, as distinguished from a gliding attitude.

*Ground apparatus*

The invention contemplates the use of certain ground apparatus in a novel and unique manner. First, adjacent the field 11 there is preferably provided a radio transmitting station 12, termed a radio range. A detailed description of range 12 is here unnecessary, since it is described in several publications, some of which are published by the Bureau of Standards and the Bureau of Air Commerce. Briefly, the range affords a path or beam for directing an aircraft in azimuth along a definite course and suitable indications are received on the craft for showing the pilot when he is on the beam and when he is departing therefrom.

At some point adjacent the airport runway and in line therewith is a suitable radiating means known as the runway localizer 13. This localizer is similar in operation to the radio range, except that it is adapted for use at a particular airport and not for cross-country flying, therefore, it may be of considerably less power output than the ordinary radio range. Suitable apparatus for radiating the runway localizer beam is shown in Fig. 5, wherein 14 designates a radio frequency oscillator of any suitable carrier frequency which feeds into a phase-shifting device 15 to divide the single carrier into two components of the same frequency, yet of different phase relation. The modified carrier is then fed through the two sets of leads 16 and 17 into a suitable modulating amplifier 18 which modulates each phase of the carrier frequency with a characteristic form of modulation, preferably audible. The carrier is then passed through any suitable goniometer 19 for regulating the displacement of the carrier in space, thence to the angularly displaced loops designated generally as 20, which will function, in a manner well-known, to propagate space patterns having two crossed lines in azimuth along which maximum energy can be received. When on a course equally between these lines, aircraft will receive energy of both rates of modulation in equal intensity, but departure from this course results in the receiving of signals of one modulation rate at a greater intensity than the other and a suitable indication thereof may be provided for the pilot. There will be four equisignal lines or legs, of course, and one is aligned with the desired runway and acts as a beam to guide aircraft to the runway and to a suitable landing.

A suitable marker beacon transmitter, shown in Fig. 4, is positioned at or adjacent the approach end of the field 11 (Fig. 10) for giving a suitable indication along line 21 to the pilot that he is nearing the runway. The beacon utilizes a high frequency oscillator 22 (Fig. 4), a modulator 23 preferably having an audible rate of modulation, and its antenna 24, shown as a dipole, located at about a quarter-wave-length above ground so that substantially all the energy is radiated in a narrow vertical lobe.

So far, the ground apparatus described has been for determining the position of the aircraft in azimuth. In addition to this apparatus, there is also provided a landing beam high frequency transmitter, preferably located adjacent the runway localizer transmitter 13, the function of which is to guide the descent of the plane in elevation. Transmitter 25, shown in Fig. 4, may be of the same type as that of the marker beacon, differing therefrom only by its rate of modulation. Preferably, the antenna 24 is a dipole and may have, if desired, an array (not shown) associated therewith for giving the space pattern any desired characteristics. Dipole 24 is arranged within a few wave lengths of the ground so that the space pattern is affected somewhat by ground reflection. In Fig. 2 there is shown the vertical disposition of a suitable space pattern 26 obtained from the landing beam radiator 24.

As indicated on the drawings, only a portion of the space pattern below the axis of maximum radiation is employed in the system of the invention, and it is well known that in this portion or area there is an infinite number of lines, each having constant field intensity. Fig. 3 shows three lines 27, 28 and 29 within this area, each of which is a line of constant field intensity of a value different from the others. A noteworthy characteristic of all the lines of constant intensity within this portion is that these lines are not parallel but diverge as the distance from the radiator increases. Close to their source they are practically indistinguishable, electrically, while at a distance of a few thousand feet they are greatly divergent. This characteristic is maintained throughout distances comparable to those suitable for a complete landing trajectory and it will be shown that by utilizing any one of these paths a craft may be safely landed. It is peculiar of each line of constant intensity that all intensities below a definite path are less than, and all intensities above the path are greater than, the intensity of the path.

The space pattern, and therefore the contours of the lines of constant intensity, can be appreciably altered in several ways. For example, the power of the transmitter may be varied, the antenna or antenna array may be raised or lowered, the antenna may be altered, or the composition of the antenna array may be changed. Any one of these factors will affect the contours of the lines, and hence the landing trajectories.

For any given antenna and/or array fixed with respect to the ground, the radiated power and the receiver sensitivity are the determinants of the trajectory to be utilized. The radiated power and receiver sensitivity are reciprocally related.

Aircraft apparatus

The system of the invention contemplates the use of certain aircraft apparatus in making a landing. An automatic pilot, which may be of the conventional gyroscopic type, is used in order to set the craft on an automatic course in azimuth and also to give the craft a fixed rate of descent. Detailed description of the automatic pilot in unnecessary, but it will be understood that the gyro pilot will take over the rudder and elevator surfaces in order to maintain the aircraft in a set course and disposition in elevation. Two vernier controls are ordinarily provided on the gyro pilot for allowing the pilot or navigator to make minute adjustments from time to time in order to effect slight changes in course and elevation. One of these verniers will control the rudder surface and the other will control the elevator. It is understood, then, that the gyro pilot does not merely retain a craft in a set disposition but actually moves the proper controlling surfaces in order to put the craft in a particular spatial position. The human pilot, however, can make adjustments to the gyro units from time to time as slight changes in course are desired.

The aircraft is equipped with suitable apparatus, shown in Fig. 6, for receiving the signals from the radio range, the runway localizer, the marker beacon, and the landing beam. The antenna 30 may be of any desired type and is connected to the receiver 31 which is tuned, preferably, so as to receive signals from the radio range and the runway localizer. The output of the receiver 31 is shown as being connected to parallel filters 32 which, in turn, lead to a pointer 33 of the instrument 34. These filters are selective, respectively, to the signals of the two modulation rates of both the radio range and the runway localizer and are connected to the vertical pointer 33 in such a manner as to cause the pointer to deflect to one side of the vertical position when the craft has moved to one side of the course, and to the other side of the vertical position when the craft moves to the other side of the course. Thus, when the craft is being guided along the radio range or the runway localizer beam, accurate indication of the course and of deviation therefrom is rendered by the vertical pointer 33 of the instrument 34.

Signals from the marker beacon and also from the landing beam are collected on a suitable antenna such as the dipole 35 shown in Fig. 6, which is connected to the high frequency receiver 36. This receiver may be of any suitable type and has its output arranged so that signals from the marker beacon will be indicated only upon indicator 37 and signals from the landing beam transmitter will be indicated only by the horizontal pointer 38 of the instrument 34. For a proper landing path to be followed, it is necessary that the sensitivity of the receiver be adjusted to a certain value so that when dipole 35 is on the proper path, the pointer 38 will be horizontal. Pointer 38 can be so oriented that it moves above horizontal when the craft is above the landing beam and below the horizontal when the craft is below the landing beam, for as was pointed out above, the intensities above a definite landing path are always greater, and the intensities below the same landing path are always less, than the intensity of the landing path.

When the craft is directly above the marker beacon radiator, receiver 36 will detect the signal of the beacon and indicate this by a deflection of the indicator 37.

It will be noticed that in Fig. 3 the path 28 has a line 39 at a constant distance below it throughout its length down to the point 40. Point 40 represents the point of contact of the landing gear with the airport, and trajectory shown as dotted line 39 represents the path traced in a vertical plane by the landing gear of the craft. Line 39 is shown as being fifteen feet below the line 28, which is followed by antenna 35. According to the invention, dipole 35 on the aircraft is situated a definite height above the landing gear, as reference to Figs. 7 and 8 will show. In Fig. 7, 41 represents the height of the proper landing path above the airport at the instant that the landing gear contacts the field. As was stated before, the lines of constant intensity diverge as the distance from the radiator increases, but when close to the radiator, the lines are practically indistinguishable, electrically. Hence, by placing the dipole 35 a definite height above the landing gear, the craft can be made to contact the ground at some point before the lines of constant intensity become indistinguishable. Further, as will be seen from Fig. 3, these lines flatten out as the radiator is approached so that if a craft attempted to follow a definite line to a point close to the radiator it might possibly overshoot the field or do damage to the landing beam ground apparatus and the aircraft, since the lines are almost asymptotic to the field. The invention contemplates, therefore, the placing of the receiving antenna 35 at such a distance above the landing gear that the craft, when on the landing path, will contact the ground before the path flattens out to too great an extent.

With a given landing beam transmitter having its power and its antenna system fixed, a wide choice of landing paths is available by either adjusting the antenna height above the landing gear, by changing the sensitivity of the landing beam receiver, or by a combination of these two variables. Also, the point of contact of an aircraft may be moved toward or away from the ground apparatus by making either or both of these adjustments. For example, if it is desired to contact the ground at point 40 (Fig. 3), then the receiver sensitivity should be set to a value to give an on-beam indication when the landing gear contacts the ground. If it is desired to contact the field at some other point, such as 50, then the sensitivity can be adjusted so that the antenna intercepts a different path upon contact of the landing gear with the field.

The craft can be made to contact the field at different points, such as 40 or 50 (Fig. 3), with the receiver having the same sensitivity, by merely changing the height of the antenna so that it is on the desired trajectory when the craft contacts the ground. For example, the craft may be placed on the airport at the point at which it is desired to have it contact in landing, and the height of antenna 35 may be adjusted until the desired path is intercepted. By this means the same ground apparatus can be made to satisfy the landing contours demanded by various types of aircraft, differing greatly in size and landing characteristics. In one instance, it was found desirable to have the landing beam antenna 15 feet above the landing gear, but the height may vary within wide limits, and in another type of craft the antenna may be arranged at some point below or above this. For example, a super-structure such as 42 in Figs. 7 and 8 may be required, in which case it may be made retractable to the position 43 indicated in dotted lines in Fig. 8 in cross-country flight.

*Operation*

In showing the operation of the invention, it may be best to take a particular type of aircraft, although it will be understood, of course, that factors such as air speed, and the contour of the proper landing path will vary according to the type of craft that is being landed. In a commercial transport of a well-known type, it is usual to fly cross-country according to the radio range at a cruising speed of approximately 180 miles an hour. Taking such a craft equipped with an automatic pilot as an example, referring to Fig. 10 at point 44, the craft is approaching the radio range transmitter 12, flying either manually or by its automatic pilot at an altitude known to be safe for that vicinity. At point 12, the pilot will be advised as to his position immediately above the station by the reception of a cone of silence or any suitable signal. At this point, knowing the position of airport 11 with respect to the radio range station at 12, he then sets his course by magnetic or gyrocompass so as to intercept the extension of the runway leg of the runway localizer at point 45. As he approaches point 45 he will be advised as to his position in the proper left quadrant by means of the vertical pointer 33, which will give indication that the runway localizer transmitter is to the left. Upon crossing the leg at point 45, the indicator pointer 33 will deflect to the opposite side, since the craft is now proceeding in the right quadrant of the localizer beam. In this quadrant a signal of modulation different from that in the left quadrant will predominate. Upon noting this deflection of the pointer 33 at point 45, the pilot executes a 270° turn so as to bring the craft directly upon the extension of the runway beam and approaching the station 13. Between points 45 and 13 the localizer indicator is reading true, since the left and right quadrants are to the left and right, respectively, of the craft. The pilot is again assured, therefore, that he is on the correct leg and also that he is approaching and not receding from the localizer array at 13. When over 13, another signal such as a cone of silence is received and the craft is now known to be receding or departing from the station 13. Further assurance is had by a reversal of indications of the pointer 33, since the right and left quadrants are now to the left and right, respectively, of the craft. At point 13 the pilot may start a stop watch or other timer and from here his air speed is kept substantially constant until he prepares to descend. From the marker beacon, which is situated somewhere along line 21, an indication of the field boundary is received by a deflection of the instrument 37 shown in Fig. 6. The pilot notes the elapsed time between station 13 and line 21 and proceeds to point 46 which is arbitrary but which may be situated at such a distance from the field as to be determined by a certain multiple of the time elapsed between 13 and 21 for a given air speed. At point 46, the pilot executes manually or by gyro pilot a 360° turn that brings the craft to point 47 heading directly on the runway beam with indicator 33 now giving true rather than opposite indications of the course. Referring momentarily to Fig. 3, the craft will be situated at some point to the right of the trajectory 28 and approaching the same, assuming that 28 is the desired landing path. The craft's engines are throttled to an air speed of about 100 miles per hour and the gyro pilot is set to a rate of descent of about 400 feet per minute. This brings the craft into the landing beam at approximately tangential relation thereto. The descent is then automatically held in both elevation and azimuth by the gyro pilot, with vernier adjustments being made by the human pilot in response to instrument indications. As the beam flattens out, the proper vernier is adjusted by the pilot, according to the pointer 38, which must be maintained in horizontal position. The effect of these adjustments is to gradually increase the angle of attack, resulting in somewhat greater lift, with very slight decrease in air speed due to the pull of the motors, which have not been adjusted during the descent. The rate of descent is thus lessened, so that just prior to contact, it is found to be about 150 feet per minute, and the airspeed is at 90 miles per hour.

As the craft crosses line 21, the marker beacon causes the needle of indicator 37 to deflect, and the pilot is thereby warned that he is nearly the point of contact with the ground, and therefore immediately after the landing he will be ready to throttle the engines and apply the brakes.

The automatic pilot is used to keep the craft on the runway until brought to a stop and also to maintain the attitude of the craft the same as it was for the latter part of the trajectory, hence at no time in the descent has it been necessary for the pilot to know his attitude nor his proximity to the field, since no change of attitude has been made except in response to the indicators, and that change has been slight.

The use of the gyro pilot in the descent relieves the human pilot of the ordinary cares incident to routine manual control, and he can devote his entire attention to the two landing indicators, and to correcting the automatically retained flight in accordance therewith. Thus the task of maintaining the attitude and the trim of the craft (which in manual flight in zero visibility must be done with additional instruments) is eliminated, and the pilot's attention can be devoted to the two indicator pointers.

Should the craft go off the runway beam due to some unpredictable cause, such as appreciable cross wind, it can be readily brought back on course by a slight adjustment of the proper gyro vernier. Since the course is automatically maintained by the gyro pilot, the human pilot does not have to concern himself with the controls, and he is left free to compensate for the chance, or unpredictable, deviations by merely adjusting the gyro vernier according to indications of the vertical pointer. In this manner, he can give just the right degree of correction, allowing for the inertia of the craft, for example, which in large transports, especially, may cause an appreciable lag between movement of the control surfaces and response of the craft.

The human pilot has the same freedom from worry in keeping the craft on the landing beam. He does not have to watch a rate of climb meter, nor an altimeter, for example, but focuses his attention on the horizontal, or landing beam indicator, and makes small corrections from time to time by means of the vernier control of the gyro pilot, as the horizontal pointer indicates the need therefor.

The value of retaining aero-dynamic stability during the complete descent of the craft will be readily understood by those skilled in the art. For example, the pilot when very close to the ground, may be informed by ordinary radio communication that a landing cannot be effected at that time, due perhaps to traffic conditions, and no matter how close to the ground he may be, he is able at once to pull up and resume normal flight until such time as he may be directed to again attempt the landing. Since the craft is at all times in flying attitude and at flying speed, normal response of the craft to movements of the control surfaces is obtained. Such a maneuver is impossible in a three-point landing and, if conditions should be such that the craft could not proceed safely along the runway, the pilot would not be able to pull up at all, since in the latter part of the landing glide the plane is in unstable condition, as has been shown.

As an additional precaution, a marker beacon, which may be similar to the boundary marker beacon at 21, with characteristic modulation, may be placed so as to radiate a signal intelligible along the line 48 so that if, for some reason, such as exceptional wind conditions, the craft is forced above the landing beam, the pilot may realize his position with relation to the field as he crosses the line 48 and may, therefore, pull up and begin another landing rather than attempt to land and overshoot the field.

In Fig. 6, the instrument 34 has been shown as being of the cross-pointer type. Of course, entirely separate instruments may be used for giving runway and landing beam indications, and under certain conditions this may prove desirable. One advantage of the cross-pointer instrument is that it localizes the observation of the pilot, affording him ready indication as to when to adjust the gyro pilot verniers. Pointers 33 and 38 cooperatively indicate the actual disposition of the craft in space with relation to the landing path. Thus, the dotted lines shown in the instrument 34 intersect in the lower left quadrant, indicating that the craft is below and to the left of the landing beam.

While a particular plan for guiding an aircraft to its airport has been set forth in Fig. 10, it will be understood that the invention contemplates other plans that will readily appear from an examination of the geography of the vicinity of each airport. Also, at point 47 (Fig. 10), the pilot may correlate a free gyro compass with the vertical pointer when the craft is directly on the runway, and then limit all right and left corrections to a definite value, such as 10°, consequently reducing to quite an extent the tendency to overcontrol and thereby cause hunting. Further, the gyro compass may be used to indicate changes in directional heading after landing and before stopping due to chance unequal application of the brakes, or if the craft has been given an appreciable angle of crab to compensate for a strong crosswind, the gyro compass may be used to indicate the change in heading necessary after landing to bring the craft into proper alignment with the runway.

The receiving antenna 35 has been shown as elevated above the craft, but this arrangement is illustrative of only one particular mounting. The antenna or collector might be placed anywhere that allows it to intercept the proper landing path at the desired height above the airport. For example, the antenna might be placed across the nose 49 of the aircraft (Figs. 7 and 8).

For simplicity, the radio range has been described as giving visual indications as to course. However, the range may give aural indications, which is quite common, but the same receiver, having supplementary means, such as headphones, can be used for detecting both the signals of the radio range and also of the runway localizer. The headphones can be used as a means of locating the position of the craft when directly above the radio range and the runway localizer stations, if desired.

It is not necessary for the pilot to use a timing device when the craft is being directed between point 13 and line 21, preparatory to landing, since a pilot may exercise his discretion as to where to make the 360° turn. Points 46 and 47 are arbitrary. The pilot may watch the indicator pointer 33 (Fig. 6) while the craft is proceeding from 21 to 46, and being above the beam at first, the pointer will be above the horizontal, and when the beam is intercepted, a momentary on-beam, or horizontal indication, will be received. The pointer will then begin to move below the horizontal. He can then proceed to any distance that he desires, before executing the 360° turn.

While the invention has been described as using an automatic pilot of the gyroscopic type, it is to be understood that any conventional type of automatic pilot or stabilizer may be employed without departing from the true scope of the invention.

The method and apparatus herein described are explanatory of one embodiment of the invention. It will be understood that various changes will occur to those skilled in the art. The invention is therefore not to be limited by the drawing and specification, but by the scope of the appended claims.

What is claimed is:

1. The method of blind-landing an aircraft fitted with an automatic pilot, on a landing field provided with means for setting up an angularly disposed radio landing beam and a beam providing a line of bearing in azimuth, which consists in piloting said craft along said line of bearing into said landing beam, setting said automatic pilot means to a landing angle whereby the craft is automatically piloted toward said field, manually adjusting said automatic pilot means to cause the craft to follow said landing beam to said field and maintaining sufficient flying speed to keep said aircraft in flying attitude until the landing gear thereof contacts the field.

2. The method of flying an aircraft in a radio beam landing employing an automatic pilot, including setting a flight by means of said automatic pilot, altering the flight in response to radio indications of a landing path, flying along said landing path, and retaining sufficient flying speed to maintain flying attitude until the landing gear of the craft contacts the surface of the runway.

3. A method of piloting an aircraft in a radio beam landing comprising setting an automatic pilot flight, receiving radio indications of the relation of said automatic pilot flight to a landing trajectory beam, bringing said automatic pilot flight into agreement with and keeping it on said trajectory, and maintaining landing speed high enough to retain a state of aerodynamic stability throughout the trajectory.

4. In a radio beam navigating system the method of landing an aircraft which comprises setting automatic pilot means in said aircraft to maintain a predetermined flight, adjusting said automatic pilot to constrain the aircraft to fly along the landing beam trajectory in accordance with radio indications received on said aircraft, maintaining said aircraft at sufficient speed along said trajectory to keep said aircraft in flying attitude, and retaining flying attitude and speed until the landing gear of said aircraft has contacted the surface of the runway.

5. The method of flying an aircraft in a radio beam landing system which includes setting a flight by means of an automatic pilot, receiving radio indications of the relation of said automatic pilot flight to said landing beam, flying along said landing beam and maintaining sufficient air speed to keep said craft in flying attitude until the landing gear thereof contacts the surface of the runway.

DONALD S. BASIM.
RAGNAR T. FRENG.
JOHN D. WOODWARD.